US012075073B2

(12) United States Patent
Meng et al.

(10) Patent No.: US 12,075,073 B2
(45) Date of Patent: Aug. 27, 2024

(54) EFFICIENT RETRIEVAL OF SENSOR DATA

(71) Applicant: Pony AI Inc., Grand Cayman (KY)

(72) Inventors: Pingfan Meng, San Bruno, CA (US); Stephen Lee, Fremont, CA (US)

(*) Notice: Subject to any disclaimer, the term of this patent is extended or adjusted under 35 U.S.C. 154(b) by 621 days.

(21) Appl. No.: 17/325,093

(22) Filed: May 19, 2021

(65) Prior Publication Data

US 2022/0377357 A1 Nov. 24, 2022

(51) Int. Cl.
*G06T 9/00* (2006.01)
*H04N 19/30* (2014.01)
*H04N 19/423* (2014.01)
*H04N 19/436* (2014.01)
*H04N 19/625* (2014.01)

(52) U.S. Cl.
CPC ............ *H04N 19/423* (2014.11); *G06T 9/00* (2013.01); *H04N 19/30* (2014.11); *H04N 19/436* (2014.11); *H04N 19/625* (2014.11)

(58) Field of Classification Search
CPC .... H04N 19/423; H04N 19/30; H04N 19/436; H04N 19/625; G06T 9/00
See application file for complete search history.

(56) References Cited

U.S. PATENT DOCUMENTS

| 7,742,644 | B2* | 6/2010 | Hwang | H04N 1/33307 |
| | | | | 382/232 |
| 2006/0259692 | A1* | 11/2006 | Sohm | G06F 11/3648 |
| | | | | 711/128 |
| 2015/0268929 | A1* | 9/2015 | Abraham | G06F 16/86 |
| | | | | 707/752 |
| 2022/0051476 | A1* | 2/2022 | Woop | G06T 3/4007 |
| 2022/0237958 | A1* | 7/2022 | Tzamaloukas | G07C 5/08 |

* cited by examiner

*Primary Examiner* — Sumati Lefkowitz
*Assistant Examiner* — Michael Adam Shariff
(74) *Attorney, Agent, or Firm* — Sheppard, Mullin, Richter & Hampton LLP; Xin Xie

(57) ABSTRACT

A computing device performs initial processing of sensor data. The computing device includes one or more processors and instructions or logic that, when executed by the one or more processors, cause the computing device to perform obtaining sensor data, encoding the sensor data, writing the encoded sensor data to a dynamically allocated buffer, and logging a status of the written encoded sensor data at a static location of the dynamically allocated buffer. The status includes any one or more of memory addresses at which frames of the sensor data begin in the dynamically allocated buffer, valid bit fields corresponding to the frames, and sizes of each of data segments within the frames. The instructions further cause the computing device to perform, in response to receiving a polling request from a computing resource, transmitting the logged status to the computing resource.

14 Claims, 14 Drawing Sheets

| Name | Read/Write | Address | Description |
|---|---|---|---|
| MAX SIZE OF CONFIG TABLE | R | 0x7000_0000 | Maximum size of configuration table |
| Start_Config | R/W | 0x7000_0020 | Indicates that data has been written into, or committed into, a rolling buffer. Once data has been written into a rolling buffer, a computing device or computing system may commence configuring data to address decoders when bit 0 is asserted. Bit 0 must be deasserted while data is being written. |
| No_Of_Data | R/W | 0x7000_0040 | Number of configuration data written into the rolling buffer. |
| OffChip_Memory | W | 0xC000_0000 | Memory storing configuration data. |

| Memory Address (Hex) | Memory Address (Binary) |
|---|---|
| 0x11000000 | 0001 0001 0000 0000 0000 0000 0000 0000 |
| 0x11000001 | 0001 0001 0000 0000 0000 0000 0000 0001 |
| 0x11000002 | 0001 0001 0000 0000 0000 0000 0000 0010 |
| 0x11000003 | 0001 0001 0000 0000 0000 0000 0000 0011 |
| ... | ... |
| 0x113FFFFF | 0001 0001 0011 1111 1111 1111 1111 1111 |
| 0x11400000 | 0001 0001 0100 0000 0000 0000 0000 0000 |
| 0x11400001 | 0001 0001 0100 0000 0000 0000 0000 0001 |
| 0x11400002 | 0001 0001 0100 0000 0000 0000 0000 0010 |
| 0x11400003 | 0001 0001 0100 0000 0000 0000 0000 0011 |
| ... | ... |
| 0x1147FFFF | 0001 0001 0100 0111 1111 1111 1111 1111 |
| 0x11480000 | 0001 0001 0100 1000 0000 0000 0000 0000 |
| 0x11480001 | 0001 0001 0100 1000 0000 0000 0000 0001 |
| 0x11480002 | 0001 0001 0100 1000 0000 0000 0000 0010 |
| 0x11480003 | 0001 0001 0100 1000 0000 0000 0000 0011 |
| ... | ... |
| 0x114FFFFF | 0001 0001 0100 1111 1111 1111 1111 1111 |

FIGURE 2F

EFFICIENT RETRIEVAL OF SENSOR DATA

BACKGROUND

On-board sensors in a vehicle, such as an autonomous vehicle (AV), supplement and bolster the vehicle's field of view (FOV) by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board sensors can be broadly categorized into two types: active sensors that provide their own energy source for operation and passive sensors that rely on an external power source for operation. On-board sensors include, for example, cameras, light detection and ranging (LiDAR)-based systems, radar-based systems, Global Positioning System (GPS) systems, sonar-based sensors, ultrasonic sensors, inertial measurement units (IMUs), accelerometers, gyroscopes, magnetometers, and far infrared (FIR) sensors. Sensor data may include image data, reflected laser data, LiDAR point cloud data, or the like. Often, images captured by on-board sensors utilize a three-dimensional (3D) coordinate system to determine the distance and angle of objects in the image with respect to each other and with respect to the vehicle. In particular, such real-time spatial information may be acquired near a vehicle using various on-board sensors located throughout the vehicle. The sensor data may then be processed to calculate various vehicle parameters and determine safe driving operations of the vehicle.

The processing of the sensor data may by accomplished by a computing processor on the vehicle, such as a central processing unit (CPU). Examples of computing processors may include an engine control module (ECM) or a powertrain control module (PCM). The computing processors may also need to, as part of the processing, encode and/or otherwise preprocess the sensor data after receiving the sensor data from the sensors. Such tasks may consume processing resources. Therefore, offloading the encoding and/or preprocessing of the sensor data away from the computing processor, in order to free up computing resources at the computing processor, may enhance an efficiency and efficacy of processing sensor data and increase a computing power of the computing processor.

SUMMARY

Described herein, in some embodiments, is a computing device configured to perform preprocessing, preliminary processing, or initial processing of sensor data, before another computing resource performs subsequent processing on the sensor data. The computing device includes one or more processors and logic and/or instructions that, when executed by the one or more processors, cause the computing device to perform obtaining sensor data, encoding the sensor data, writing the encoded sensor data to a dynamically allocated buffer, and logging a status of the written encoded sensor data at a static location of the dynamically allocated buffer. The status includes any one or more of memory addresses at which frames of the sensor data begin in the dynamically allocated buffer, valid bit fields corresponding to the frames, and sizes of each of data segments within the frames.

In some embodiments, the logic and/or instructions further cause the computing device to perform, in response to receiving a polling request from a computing resource, transmitting the logged status to the computing resource over a same physical link through which the written encoded sensor data is transferred. In some alternate embodiments, the computing resource may itself read the logged status from the computing device. In some embodiments, the logic and/or instructions may be stored non-transitory storage media, or may be uploaded, electronically wired, and/or coded into the processors.

In some embodiments, the sensor data includes camera data; and the encoding of the sensor data includes encoding the sensor data into a JPEG format.

In some embodiments, the computing device further includes processor cores that each encode different segments of the sensor data in parallel using restart markers that indicate a beginning or an ending of each of the different segments.

In some embodiments, one of the processor cores obtains a JPEG thumbnail; and an other of the processor cores obtains a planar RGB representation of the sensor data.

In some embodiments, the logic and/or instructions further cause the computing device to remove headers on at least one of the different segments.

In some embodiments, the processor cores include first processor cores that encode different segments of the sensor data from a first camera, and second processor cores that encode different segments of the sensor data from a second camera.

In some embodiments, the frames include data types; and the status further includes a number of the data types supported by the computing device, a number of bytes in each field of each of the data segments; and a width of each of the data types.

In some embodiments, the logic and/or instructions further cause the computing device to dynamically allocate the buffer based on an amount and an information content of the sensor data obtained.

In some embodiments, each of the valid bit fields indicate a bit mask corresponding to a data segment, the bit mask being determined by a spatial sequence in which the sensor data is ordered, the bit mask including a write lock functionality.

In some embodiments, the logging of the status includes storing the status in a table; and wherein the sensor data includes data from a LiDAR sensor.

In some embodiments, the computing device includes one or more processors and logic and/or instructions that, when executed by the one or more processors, cause the computing device to perform obtaining sensor data, writing the sensor data to first addresses of a dynamically allocated buffer associated with the computing device, encoding the sensor data, and writing the encoded sensor data to second addresses of the dynamically allocated buffer. The logic and/or instructions further cause the computing device to perform, in response to completing the writing of the encoded sensor data, indicating that the writing of the encoded sensor data has been completed.

In some embodiments, the logic and/or instructions further cause the computing device to perform, receiving, from a computing resource, a polling request to read the encoded sensor data. Next, the computing device may transmit, to the computing resource, a status that the writing of the encoded sensor data to the second addresses has been completed. The computing device may then write, to a memory of the computing resource, the encoded sensor data. The computing device may then receive, from the computing resource, a second status that the encoded sensor data has been written, and remove, from the dynamically allocated buffer, the encoded sensor data.

In some embodiments, the computing resource can itself perform a polling operation to read the status in the table and read or retrieve the encoded sensor data from the computing device, for example, from the second addresses of the dynamically allocated buffer. The computing device may then receive, from the computing resource, a second status that the encoded sensor data has been written, and remove, from the dynamically allocated buffer, the encoded sensor data.

In some embodiments, the logic and/or instructions may be stored in non-transitory storage media, or may be uploaded, electronically wired, and/or coded into the processors.

In some embodiments, the instructions or logic further cause the computing device to perform writing subsequent encoded sensor data to the second addresses, and reading, to the memory of the computing resource, the subsequent encoded sensor data in response to the writing of the subsequent encoded sensor data to the second addresses being completed. The subsequent encoded sensor data may be encoded separately from, and after, the encoding of the sensor data.

In some embodiments, the indicating that the writing of the encoded sensor data has been completed includes setting one or more bits in a bit field to a second value from a first value to indicate that the encoded sensor data has been committed to the dynamically allocated buffer.

In some embodiments, the receiving, from the computing resource, the second status, includes detecting that the one or more bits have been reset to the first value from the second value.

In some embodiments, the instructions or logic prevent the computing device from resetting the one or more bits to the first value from the second value.

In some embodiments, the status that the writing of the encoded sensor data to the second addresses has been completed is transmitted through a table, wherein the table further includes any one or more of memory addresses at which frames of the sensor data begin in the dynamically allocated buffer, valid bit fields corresponding to the frames, and sizes of each of data segments within the frames.

In some embodiments, the table is transmitted over a same physical link through which the encoded sensor data is read.

In some embodiments, the instructions or logic further cause the computing device to receive, through a protocol between the computing device and the computing resource, a location of the table as set by the computing resource.

In some embodiments, the status that the writing of the encoded sensor data to the second addresses has been completed is transmitted through a register accessible to the computing resource.

In some embodiments, the sensor data includes camera data and LiDAR point cloud data; and the encoded of the sensor data includes encoding the sensor data into a JPEG format.

Various embodiments of the present disclosure provide a method implemented by a computing system as described above.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 2A-2H illustrate implementations of a computing device shown in accordance with FIGS. 1A-1B, and in accordance with an example embodiment of the present disclosure. In particular, FIGS. 2A-2H illustrate exemplary implementations of memory-related features of the computing device, including allocation, reading, and/or writing.

FIG. 2A illustrates a diagram showing a dynamic allocation of a memory of a computing device shown in accordance with FIGS. 1A-1B, and in accordance with an example embodiment of the present disclosure.

FIG. 2B illustrates a process of configuring a memory of a computing device, shown in accordance with FIGS. 1A-1B and FIG. 2A, and in accordance with an example embodiment of the present disclosure.

FIG. 2C illustrates a configuration register that indicates a configuration of a memory of a computing device, shown in accordance with FIGS. 1A-1B and FIGS. 2A-2B, and in accordance with an example embodiment of the present disclosure.

FIG. 2D illustrates an organization or definition of a memory which includes different types of structs stored in the memory, shown in accordance with FIGS. 1A-1B and FIGS. 2A-2C, and in accordance with an example embodiment of the present disclosure.

FIG. 2E illustrates a layout of a memory, shown in accordance with FIGS. 1A-1B and FIGS. 2A-2D, and in accordance with an example embodiment of the present disclosure.

FIG. 2F illustrates a hex to binary conversion to obtain or read the sensor data at proper memory addresses of the memory, shown in accordance with FIGS. 1A-1B and FIGS. 2A-2E, and in accordance with an example embodiment of the present disclosure.

FIG. 2G illustrates a common communication channel used by a computing system to obtain sensor data and a status of a memory, shown in accordance with FIGS. 1A-1B and FIGS. 2A-2F, and in accordance with an example embodiment of the present disclosure.

FIG. 2H illustrates an atomicity mechanism of reading and/or obtaining preprocessed or raw sensor data without overwriting unread sensor data, shown in accordance with FIGS. 1A-1B and FIGS. 2A-2G, and in accordance with an example embodiment of the present disclosure.

FIGS. 3A-3C illustrate exemplary implementations of initial processing of sensor data, such as encoding.

FIG. 3A illustrates a process of encoding sensor data by processor cores, shown in accordance with FIGS. 1A-1B and FIGS. 2A-2H, and in accordance with an example embodiment of the present disclosure.

FIGS. 3B-3C illustrate a process of obtaining a JPEG thumbnail by processor cores, shown in accordance with FIGS. 1A-1B, FIGS. 2A-2H, and FIG. 3A, and in accordance with an example embodiment of the present disclosure.

DETAILED DESCRIPTION

Figure 1A:
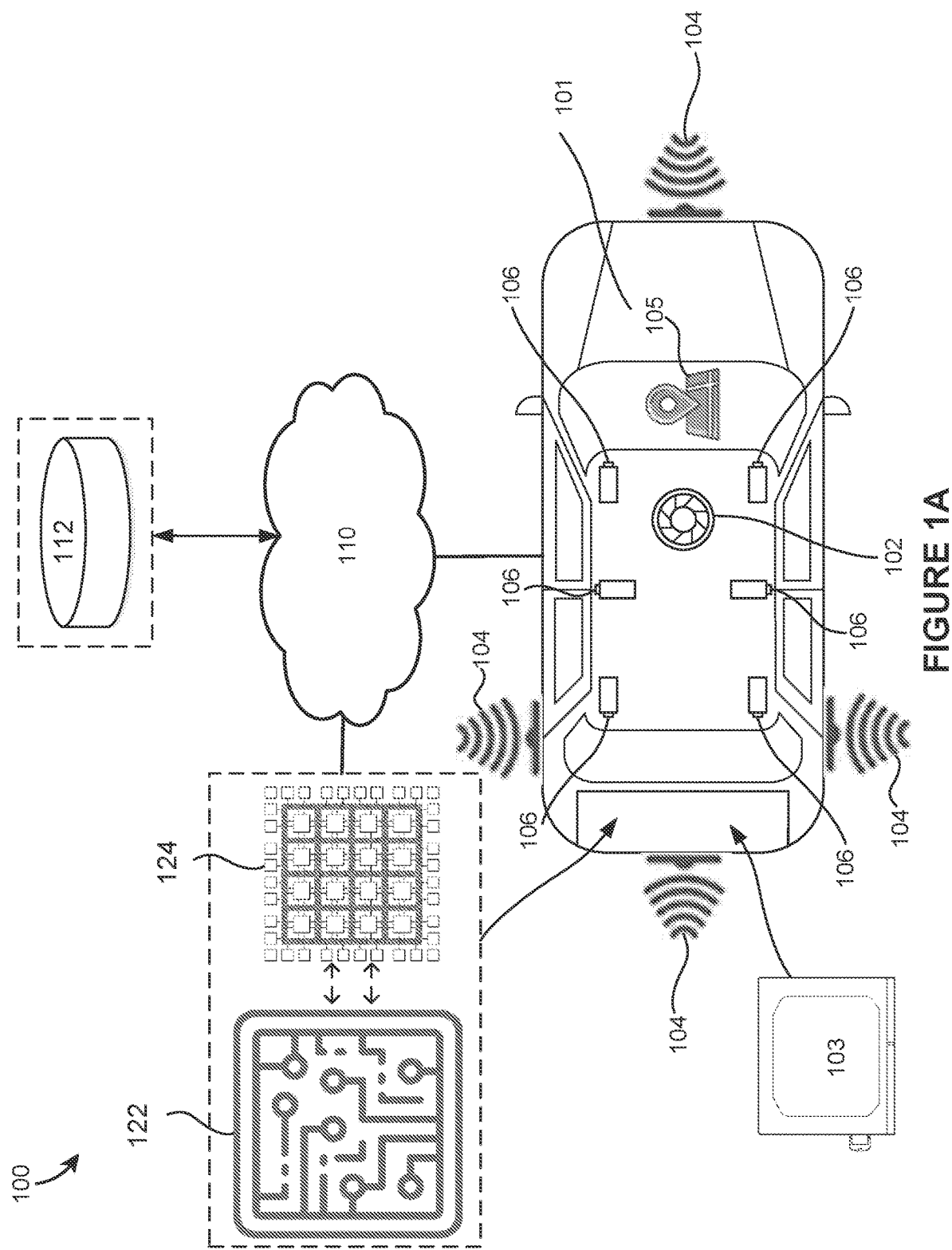
FIG. 1A illustrates an example environment of a system that acquires sensor data, preprocesses, and processes the sensor data, according to an embodiment of the present disclosure.

A computing system of a vehicle, such as an ECM and/or a PCM, receives inputs of data and processes the data upon receipt. In some embodiments, the data may include sensor data such as camera data, LiDAR data, radar data, GPS data, and/or data from sonars, ultrasonic sensors, IMUs, FIR sensors, accelerometers, gyroscopes, or magnetometers. To streamline the processing of sensor data, the sensor data may be preprocessed and/or packaged into portions that facilitate efficient processing of such data before receipt by the computing system. For example, a separate computing device or chip (hereinafter "computing device"), such as a FPGA (field-programmable gate array), may preprocess the sensor data, store the preprocessed sensor data in a memory, and/or package, assemble, or bundle, the sensor data. The preprocessing of the sensor data may encompass encoding the sensor data, such as, encoding raw image or video data, into a JPEG (Joint Photographic Experts Group) format. The computing system may obtain or retrieve the preprocessed sensor data from memory of the computing device or chip. The memory may be dynamically allocated depending on an amount of sensor data, a size of a sensor data stream, and/or actual information content of the sensor data. For example, if the sensor data is capturing a busy street, an amount of memory allocated may be larger compared to a scenario in which the sensor data is capturing open or sparse regions. Additionally, if the sensor data includes multiple modalities or streams, such as multiple LiDAR and multiple cameras capturing data simultaneously, an amount of memory allocated may be larger compared to a scenario in which the sensor data only includes a single modality and/or a single stream. Therefore, the computing system needs to determine a proper segment, or proper addresses, of the memory from which to retrieve the sensor data, because the computing system cannot retrieve from a same address and/or a same size segment of the memory every time the computing system is trying to obtain sensor data from the memory. In particular, if the computing system retrieves a larger size segment than is necessary, for instance, a larger size segment than that including the sensor data, the computing system would need to perform extra processing to handle the superfluous segment or segments, thus compromising an efficiency of the computing system. In order to retrieve sensor data from proper addresses of the memory, the computing system may retrieve a status of current, or most up-to-date, memory allocation and/or utilization. Because the computing system does not have full or autonomous control of the memory allocation and/or utilization in the memory of the computing device, the computing system needs to receive periodic updates of the status of the memory in order to determine particular addresses from which to retrieve relevant sensor data. The periodic updates may be tracked using a counter on the computing system. The periodic updates may be, for example, at a frequency of every 20 milliseconds or 100 milliseconds. As a result of the computing system using such a manner of retrieving a status of current memory allocation, the computing system may not need to solely rely on soft interrupts, such as 16-bit MSI (Message Signal Interrupts)-X, in order to determine or identify when to retrieve the sensor data from the memory. The soft interrupts may be limited in number and provide limited data. Soft interrupts may be transmitted by the computing device to inform the computing system that the computing device has received and/or preprocessed urgent data that may be important for planning and control of the vehicle 101. Thus, soft interrupts may be used in a situation when the computing device requires the urgent data before the computing device may receive the urgent data through period updates of the status of current memory allocation. For example, the computing device may be associated with or connected to a deep learning neural network and/or object detection algorithm that detects when certain objects such as a traffic light or emergency signal appear while the vehicle 101 is driving. Upon such detection, the computing device may transmit a message or other indication to the computing system that urgent data has been received and/or preprocessed, so that the computing system would read the urgent data ahead of an original scheduled time. Additionally, the computing system may ensure atomicity of the sensor data, and that sensor data is not erased or written over prior to being read into the computing system.

FIG. 1A illustrates an example environment 100 of a system that acquires sensor data, preprocesses, and processes the sensor data. In FIG. 1A, a vehicle 101 such as an autonomous vehicle may include sensors such as LiDAR sensors 102, an inertial measurement unit (IMU) 103, radar sensors 104, a GPS or GNSS sensor (hereinafter "GPS sensor") 105, cameras 106, accelerometers, gyroscopes, magnetometers, and FIR (far infrared) sensors to detect and identify objects in a surrounding environment. The sensor data may include pictorial or image data such as pictures or videos, audio data, audiovisual data, timestamp data, and/or other data indicating a position and/or pose of the vehicle 101 captured in either real-time or with a time delay. The vehicle 101 can also include myriad actuators to propel and navigate the vehicle 101 in the surroundings. Such actuators may include, for example, any suitable electro-mechanical devices or systems such as actuators including drive-by-wire (DBW) actuators to control a throttle response, a braking action, a steering action, etc.

The environment 100 may also include one or more servers 112 accessible to a computing system 122. The one or more servers 112 may store frames of data from the sensors of the vehicle 101. The one or more servers 112 may be accessible to the computing system 122 either directly or over the communication network 110. In some instances, the one or more servers 112 may include federated data stores, databases, or any other type of data source from which data may be stored and retrieved, for example. In some embodiments, the one or more servers 112 may store raw sensor data, preprocessed sensor data, processed sensor data, and/or integrated or fused sensor data.

In some implementations, the one or more servers 112 may store point clouds which may be registered, or post-processed global navigation satellite system (GNSS)-inertial navigation system (INS) data. In general, a user operating a computing device can interact with the computing system 122 over the communication network 110, for example, through one or more graphical user interfaces and/or application programming interfaces. The computing system 122 may include one or more processors such as a graphics processing unit (GPU) and/or a central processing unit (CPU). The computing system 122 may include, for example, an integrated circuit containing a high-performance microprocessor or microcontroller such as a graphical processing unit (GPU) capable of executing algorithms that require processing large blocks of data (e.g., sensor data) in parallel, for example. In some example embodiments, the computing system 122 may include multiple types of processing units such as GPUs and CPUs potentially distributed across multiple computing devices and in communication with one another via one or more communication buses. The computing system 122 may perform processing such as deep learning, which may include functions of convolutional neural networks (CNN). The functions of the computing system 122 will be described further in the subsequent figures. Engines/program modules as described below can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. A system or device described herein as being configured to implement example embodiments of the invention can include one or more processing circuits, each of which can include one or more processing units or cores. Computer-executable instructions can include computer-executable program code that when executed by a processor core can cause input data contained in or referenced by the computer-executable program code to be accessed and processed by the processor core to yield output data. In some embodiments, the computing system 122 may include general purpose logic and may be non-cycle accurate.

In some embodiments, the computing system 122 may retrieve, read, copy, and/or obtain preprocessed sensor data from a computing device 124. In some embodiments, the computing device 124 may include a field-programmable gate array (FPGA) including custom logic specifically configured to perform a particular task or tasks. In some embodiments, the computing device 124 may be cycle accurate. The computing system 122 may retrieve a snapshot, summary, and/or indication of an up-to-date memory allocation of the computing device 124 so that the computing system 122 retrieves sensor data from proper addresses in the memory. Such a snapshot, summary, and/or indication may be manifested in a form of a status table, in some embodiments, that is transmitted through a same channel as sensor data is transmitted through.

Figure 1B:
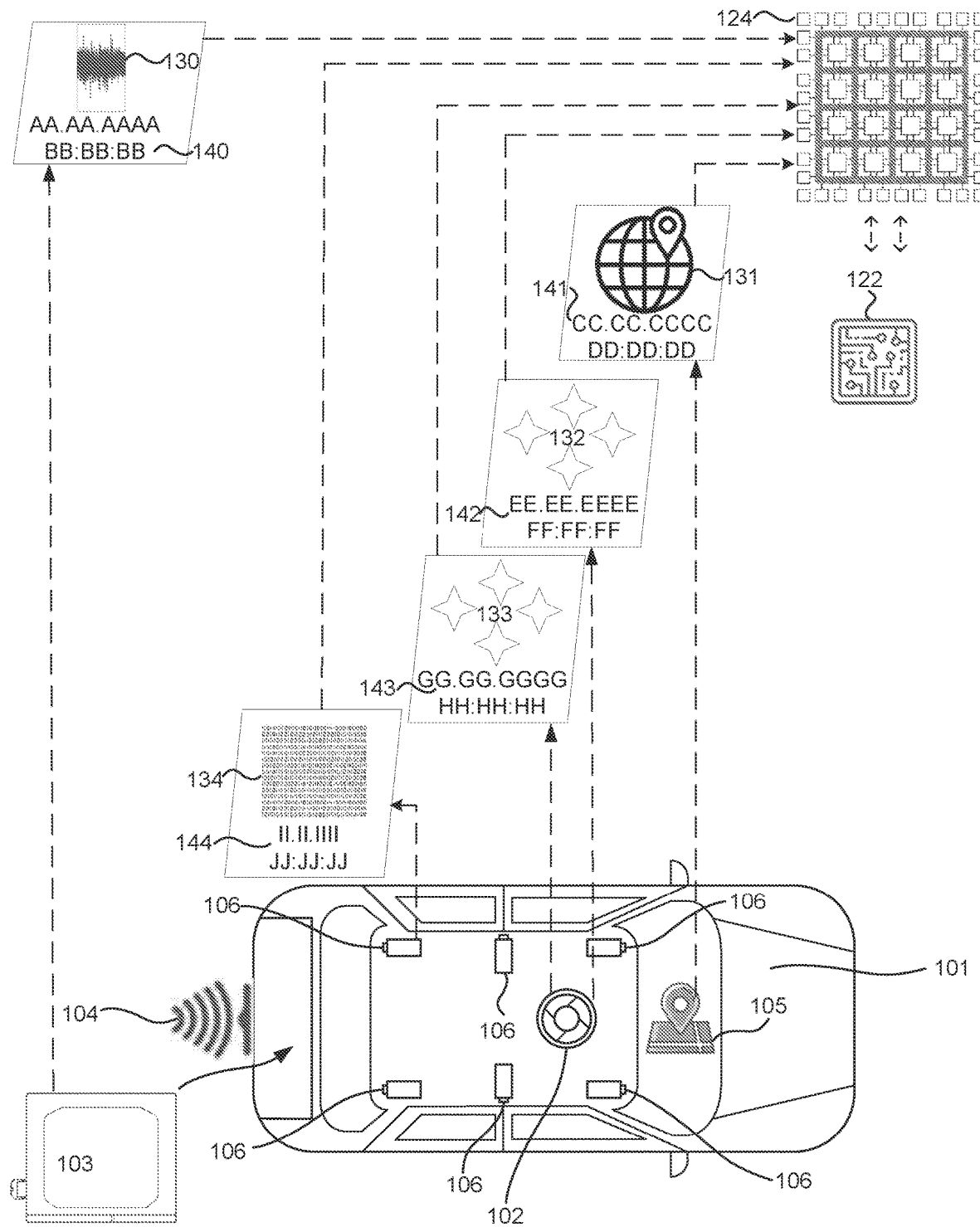
FIG. 1B illustrates a hybrid data flow and block diagram that depicts a system that acquires sensor data, preprocesses, and processes the sensor data, in accordance with an example embodiment of the present disclosure.

FIG. 1B illustrates a hybrid data flow and block diagram that illustrates a processing sensor data from the vehicle 101, in accordance with an example embodiment. In FIG. 1B, the computing system 122 may include one or more hardware processors. In some embodiments, sensor data fed to the computing device 124 for preprocessing may include, without limitation, odometry data 130 and 131 from the IMU 103 and the GPS sensor 105, respectively, and having respective timestamps 140 and 141. The sensor data may further include two-dimensional (2-D) or three-dimensional (3-D), or 2-D/3-D point cloud frames 132 and 133 captured by the LiDAR sensors 102 and having respective timestamps 142 and 143. The sensor data may further include camera data 134 captured by the camera 106 and having a timestamp 144. The sensor data fed into the computing device 124 may be preprocessed to save computing resources of the computing system 122. The preprocessing, or preliminary processing/initial processing, by the computing device 124 may include encoding the sensor data, packaging, assembling, or bundling the sensor data, and/or integrating or fusing the sensor data. The encoding may include, for example, encoding image or video data such as the camera data 134 into JPEG format, or encoding or compressing point cloud data such as the point cloud frames 132 and 133 from the LiDAR sensors 102. The integrating or fusing of the sensor data may include, for example, combining sequential frames of image or video data and/or point cloud data, and/or fusing the image or video data and the point cloud data. Thus, at least some of the preprocessing functions that would otherwise be carried out by the computing system 122 may be offloaded to the computing device 124 in order to conserve some of the computing resources of the computing system 122.

Figure 2A:
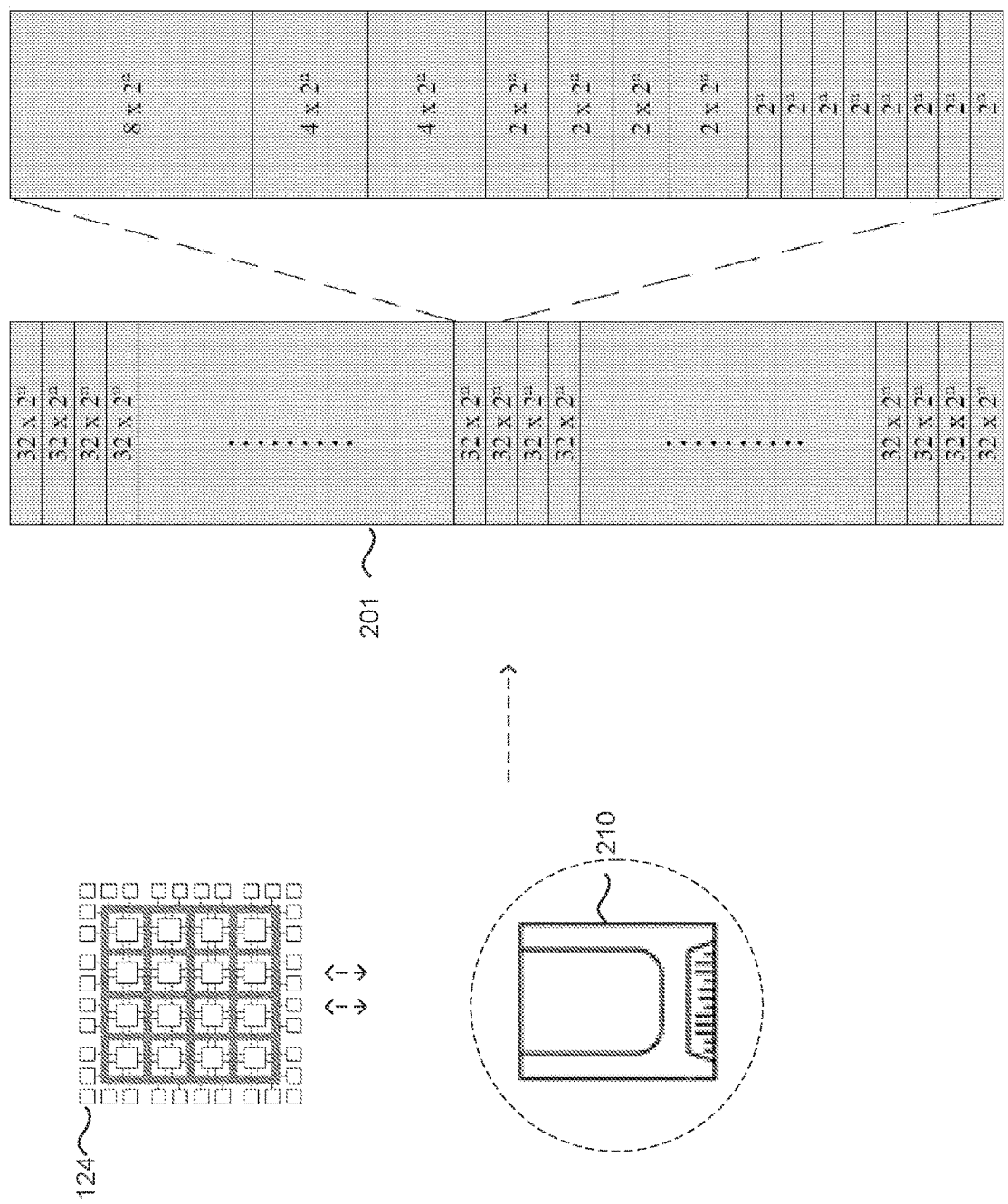

The computing device 124 may store incoming or raw sensor data in a memory 210, preprocess the sensor data, for example, using a switch, and store the preprocessed sensor data in different addresses of the memory 210. A diagram showing a dynamic allocation process of the memory 210 is illustrated in FIG. 2A. In some embodiments, the memory 210 may be dynamically allocated either by an address allocator of the computing device 124 or a separate processor that manages the memory 210. The dynamic allocation may include, for example, partitioning the memory 210 into blocks 201, and further partitioning the blocks 201 into variable-sized sub-blocks 202. The blocks 201 may have a size of 32 by $2^n$ bytes, in some example implementations. The sub-blocks 202 may have sizes including from $2^n$, 2 by $2^n$, 4 by $2^n$, and 8 by $2^n$ bytes, in some example implementations. The dynamic allocation may further include generating a set of addresses within the blocks 201 and/or the sub-blocks 202, which are to be used to temporarily store incoming sensor data. For example, a number of buffer slots, such as 16, may be allocated to store the incoming sensor data. The address allocator may transmit addresses at which the incoming sensor data is temporarily stored to a switch, or a processing core, responsible for the preprocessing. Following successful completion of the preprocessing, the preprocessed sensor data may be stored in other unused addresses within the blocks 201 and/or the sub-blocks 202. When a frame of the preprocessed sensor data is stored in a second address, and the frame is of a same portion of, or corresponds to, a frame of the incoming sensor data stored in an address, the address allocator may correlate, via an address key, the address to the second address. The address key may indicate that the address and the second address store corresponding frames of the same sensor data, before and after preprocessing, and that one of the corresponding frames has been successfully preprocessed. The corresponding frames may be, for example, camera data that was captured at a particular timestamp, or LiDAR point cloud data that was captured at a particular timestamp, before and after preprocessing.

Figure 2B:
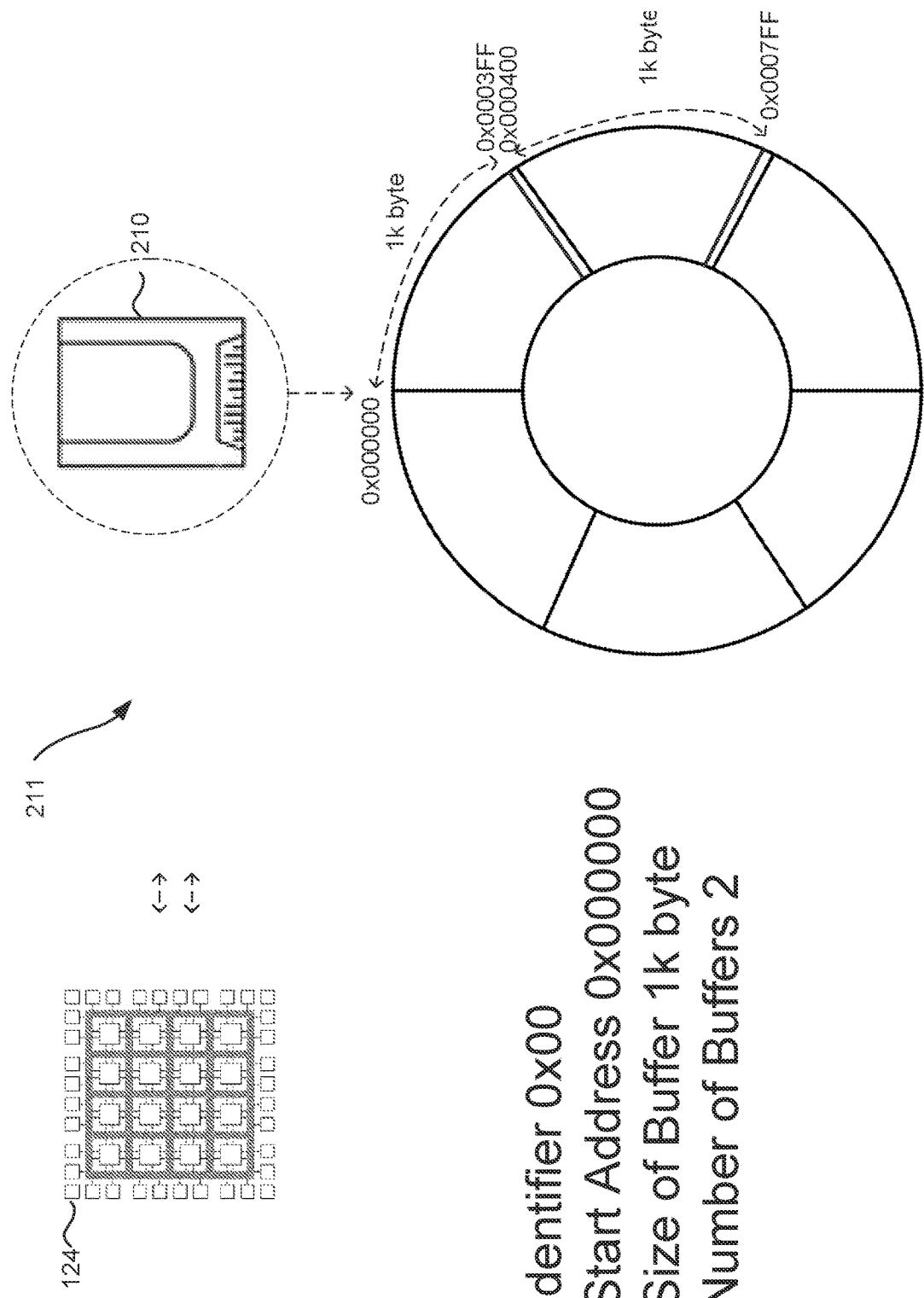

As illustrated in FIG. 2B, the memory 210 may include one or more rolling buffers to temporarily store the incoming and/or preprocessed sensor data, and/or a SDRAM (Synchronous Dynamic Random-Access Memory), such as a DDR4 (Double Data Rate 4) memory, that temporarily stores the incoming and/or preprocessed sensor data. The memory 210 may be disposed on the computing device 124 or may be off-chip, separate from the computing device 124. The memory 210 may be 256 bits wide. Initially, each bit may be set to one. In some embodiments, the computing system 122 may program or implement a configuration 211 of the memory 210, through a register map, to set and/or determine addresses and/or buffers in which the incoming and/or preprocessed sensor data is to be stored, and a number of buffers, or slots, to be occupied by a struct of sensor data that corresponds to a specific timestamp or range of timestamps, as well as a number of bytes in each of the buffers. The configuration 211 may include a rolling buffer identifier of each rolling buffer, a starting address of each rolling buffer, a size of each rolling buffer, and a number of rolling buffers occupied. As shown in FIG. 2B, the configuration 211 includes a rolling buffer identifier 0x00, a start address 0x000000, a size of each buffer, indicated, for example, as 1 k bytes, and a total number of buffers indicated as being two. Such information may be stored in fields of the memory 210 starting from a least significant bit of the memory 210. For example, each rolling buffer identifier stored in the memory 210 may be two bytes wide, each offset address may be eight bytes wide, each buffer size may be eight bytes wide, and a number of rolling buffers may be two bytes wide. Each of the two rolling buffers, one from 0x000000 to 0x0003FF and another from 0x000400 to 0x0007FF, may store sensor data from one or more cameras. As new frames of sensor data are preprocessed, the computing device 124 cycles through the rolling buffers and stores the preprocessed frames into unoccupied slots of the rolling buffers. If all buffers in a rolling buffer are occupied and no additional space in that rolling buffer is available, the computing device 124 may flag an error and/or proceed to a subsequent rolling buffer. The configuration 211 may be persistent, meaning that while the vehicle 101 is turned on, the configuration 211 is immutable.

Certain parameters and/or aspects of the configuration 211, may be defined within a configuration register 212, as shown in FIG. 2C, and may be additionally in the memory 210 or in a register separate from the memory 210. For example, the configuration register 212 may include a maximum size of a configuration table, configuration data including a bit indicating whether data has been written into a rolling buffer, an amount of configuration data written into and/or a corresponding memory address to which configuration data has been written into the rolling buffer, and a particular memory, such as the memory 210, into which configuration data has been written.

Figure 2D:
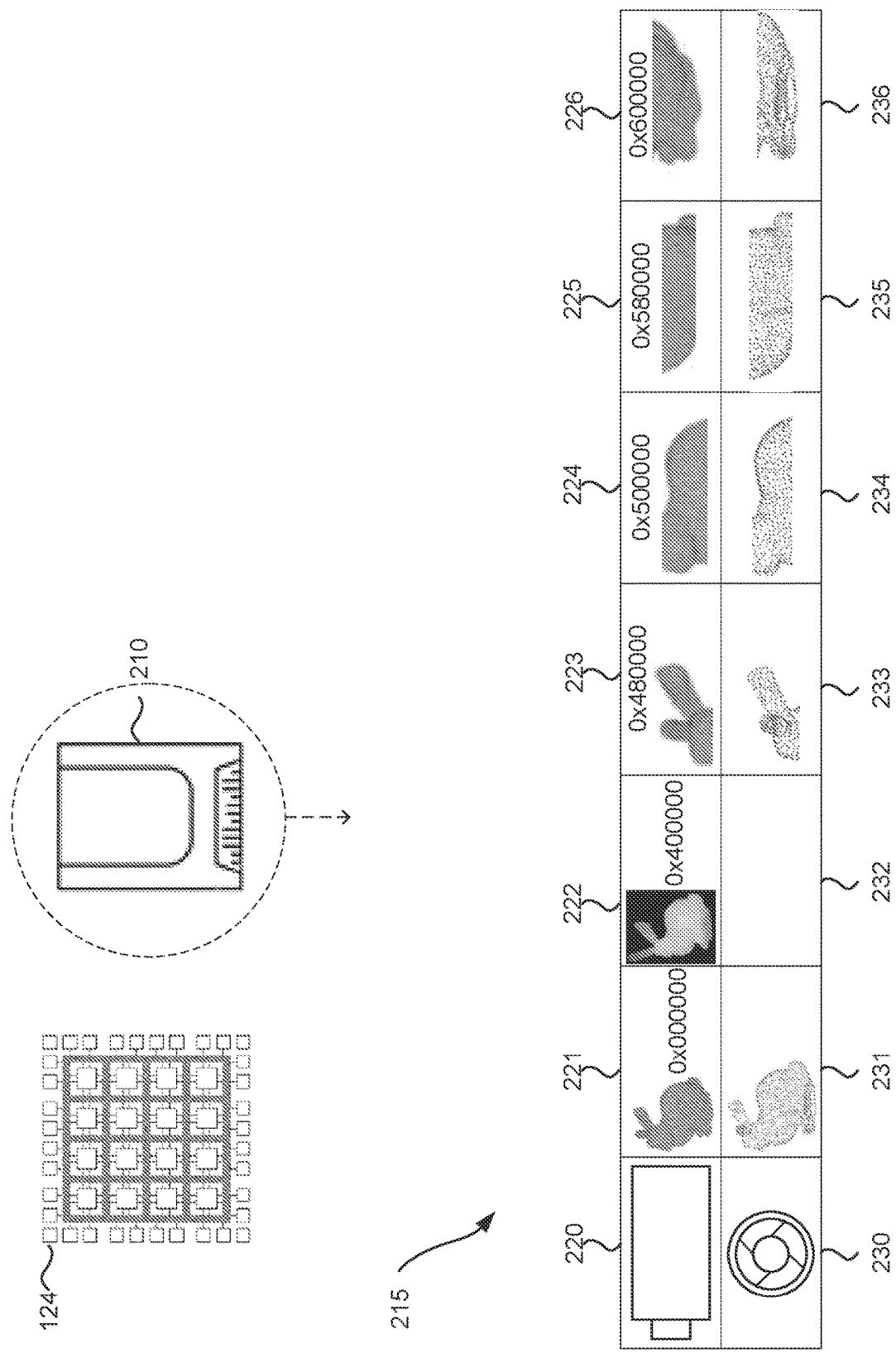

In some embodiments, as shown in FIG. 2D, an organization or definition 215 (hereinafter "organization") of the memory 210 within each of the rolling buffers may include different types of structs supported by the computing device 214 and stored in the memory 210, and how data categorized under each of the different types of structs is divided or segmented. For example, the organization 215 of the memory 210 may include a camera frame struct 220, and different manifestations or types of encoding done on data from camera frames, such as, a JPEG thumbnail segment 221 starting at a memory address offset of 0x000000, a planar RGB (Red Green Blue) segment 222 starting at a memory address offset of 0x400000, and JPEG segments 223, 224, 225, and 226, which start at memory address offsets 0x480000, 0x500000, 0x580000, and 0x600000, respectively. The JPEG thumbnail segment 221 may include undersampled features of the camera frames. The JPEG segments 223, 224, 225, and 226 may include different portions of a camera frame, such as, a top portion, central portions, and bottom portions. The memory address offsets may be determined based on a maximum allocated byte size of each segment, such as the JPEG thumbnail segment 221, the planar RGB segment 222, and the JPEG segments 223, 224, 225, and 226. For example, the maximum allocated byte size of each segment may be four bytes. The memory address offsets and the maximum allocated byte size of each segment may be configured by the computing system 122. The organization 215 of the memory 210 may further include a LiDAR frame struct 230, and different manifestations or types of encoding done on data from LiDAR frames, such as, a point cloud 231, and point cloud segments 233, 234, 235, and 236, which may include a top portion, central portions, and a bottom portion of the LiDAR data frame. In some embodiments, the organization 215 of the memory 210 may include null segments, or empty segments, such as a null segment 232. Memory address offsets of the LiDAR frame struct 230 are not shown for simplicity. Other frame structs may include raw, fused or integrated data frame structs, such as, fused LiDAR and camera data.

Figure 2E:
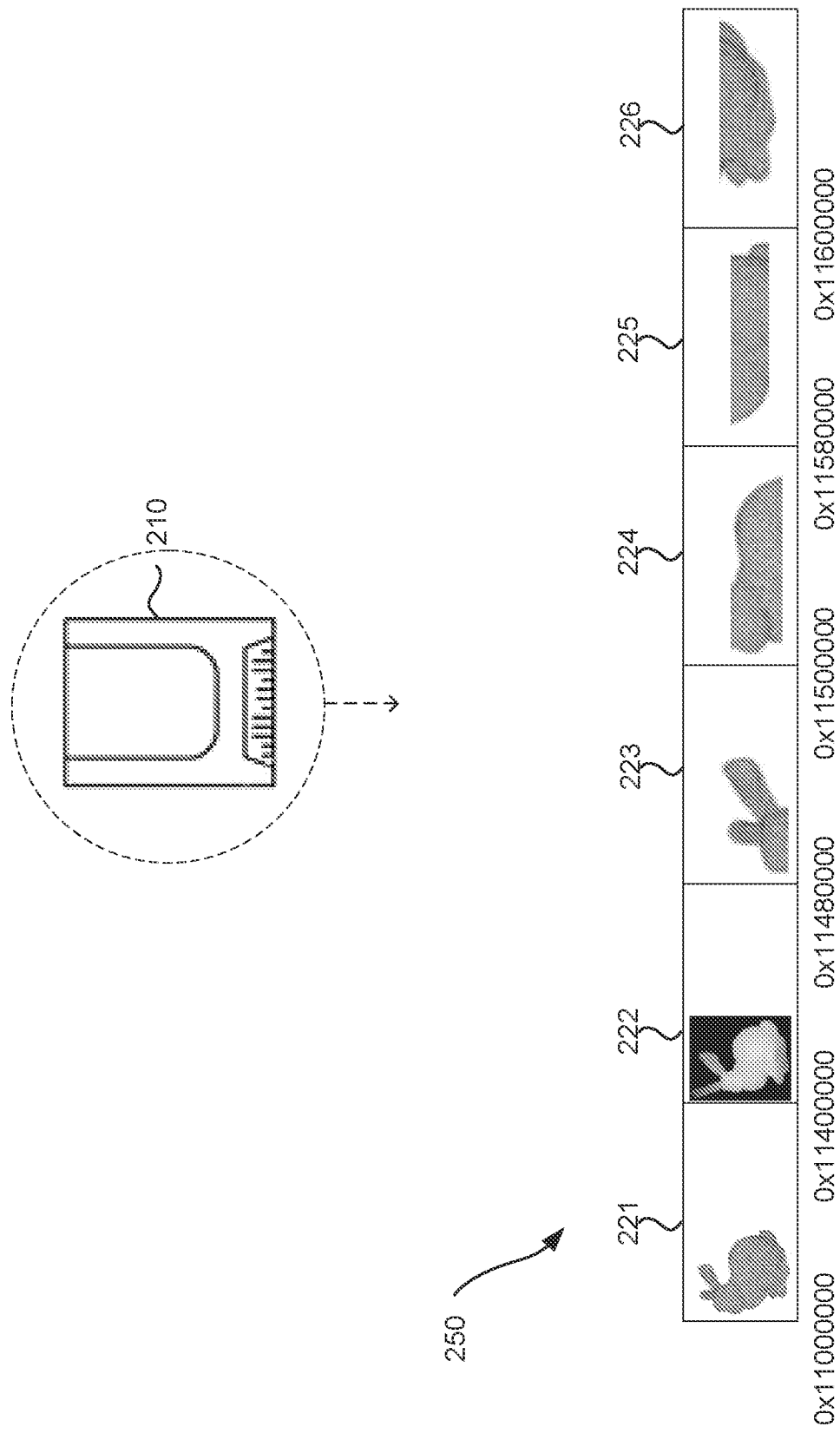

In some embodiments, as shown in FIG. 2E, a layout 250 of the memory 210 may include a JPEG thumbnail segment 221 starting at a physical memory address of 0x11000000, a planar RGB (Red Green Blue) segment 222 starting at a physical memory address of 0x11400000, and JPEG segments 223, 224, 225, and 226, which start at physical memory addresses of 0x11480000, 0x11500000, 0x11580000, and 0x11600000, respectively. The physical memory addresses at which each segment begins may be determined by the respective memory address offsets of FIG. 2D. Physical memory addresses of the LiDAR frame struct 230 are left out for simplicity.

As referred to earlier, the memory 210 may be dynamically allocated. For example, the memory 210 may be allocated based on an amount of raw or preprocessed sensor data, a modality or modalities of the raw or preprocessed sensor data, and/or an information content of the raw or preprocessed sensor data, such as, if the raw or preprocessed sensor data includes open regions or dense areas. Therefore, because a size and/or structure of the memory 210 is variable, a computing resource such as the computing system 122 requires an up-to-date status of the memory 210 to retrieve raw or preprocessed sensor data (hereinafter "sensor data") at proper addresses of the memory 210. The computing system 122 does not have direct control over the memory 210. The computing system 122 may, by periodic polling, retrieve or read a snapshot, summary, and/or indication of the status of the memory 210 from a status table including some or all information as shown in the organization 215 of FIG. 2D and the layout 250 of FIG. 2E. The periodic polling may include a request for the status of the memory 210 and/or for the raw or preprocessed sensor data. A CPU of the computing system 122 may retrieve or read the status of the memory 210. In particular, the computing system 122 may retrieve data types or struct types and particular data segments within each of the struct types, start addresses of each of the struct types and data segments within the struct types, valid bit field, and sizes of each of the data segments, and read such information using a register map provided by the computing device 124. Struct types may include camera frame data and/or LiDAR frame data, as illustrative examples. The status of the memory 210 may also indicate start addresses of headers, start addresses of the sensor data, and lengths occupied by the sensor data. The computing system 122 may further obtain, from a status register of the computing device 124, a number of struct types supported by the current computing device 124, a number of bytes in each field of each of the segments (for example, 1 byte, 2 bytes, or 4 bytes), which may be less than or equal to a maximum allocated byte size of each segment, and a width of the struct type (for example, 32 bytes or 64 bytes). Each segment of data may be referred to by the valid bit field indicating a bit mask corresponding to that segment. The bit mask of each segment may be determined by a spatial sequence in which the sensor data is ordered in a particular struct type. For example, if the JPEG thumbnail segment 221 is the first segment in the camera frame struct 220, the bit mask of a field corresponding to the JPEG thumbnail segment is 0. The bit mask of a field is implemented to ensure write lock, such that a memory address corresponding to a field cannot be reused unless the bit mask of that field is cleared. In some embodiments, only the computing system, not the computing device, may clear the bit mask of a field. In some embodiments, the spatial sequence in which the sensor data is ordered does not necessarily correspond to a temporal sequence in which the sensor data occupies the memory 210. For example, the planar RGB segment 222 may occupy the memory 210 before the JPEG thumbnail segment 221, even though spatially, the JPEG thumbnail segment 221 appears first.

Subsequently, the computing system 122 may obtain or read the sensor data at proper memory addresses of the memory 210 using a register map provided by the computing device 124 and via a hex to binary conversion 260, as shown in FIG. 2F. The computing system 122 may copy the sensor data from the memory 210 of the computing device 124 to a memory of the computing system 122 via direct memory access (DMA).

Figure 2G:
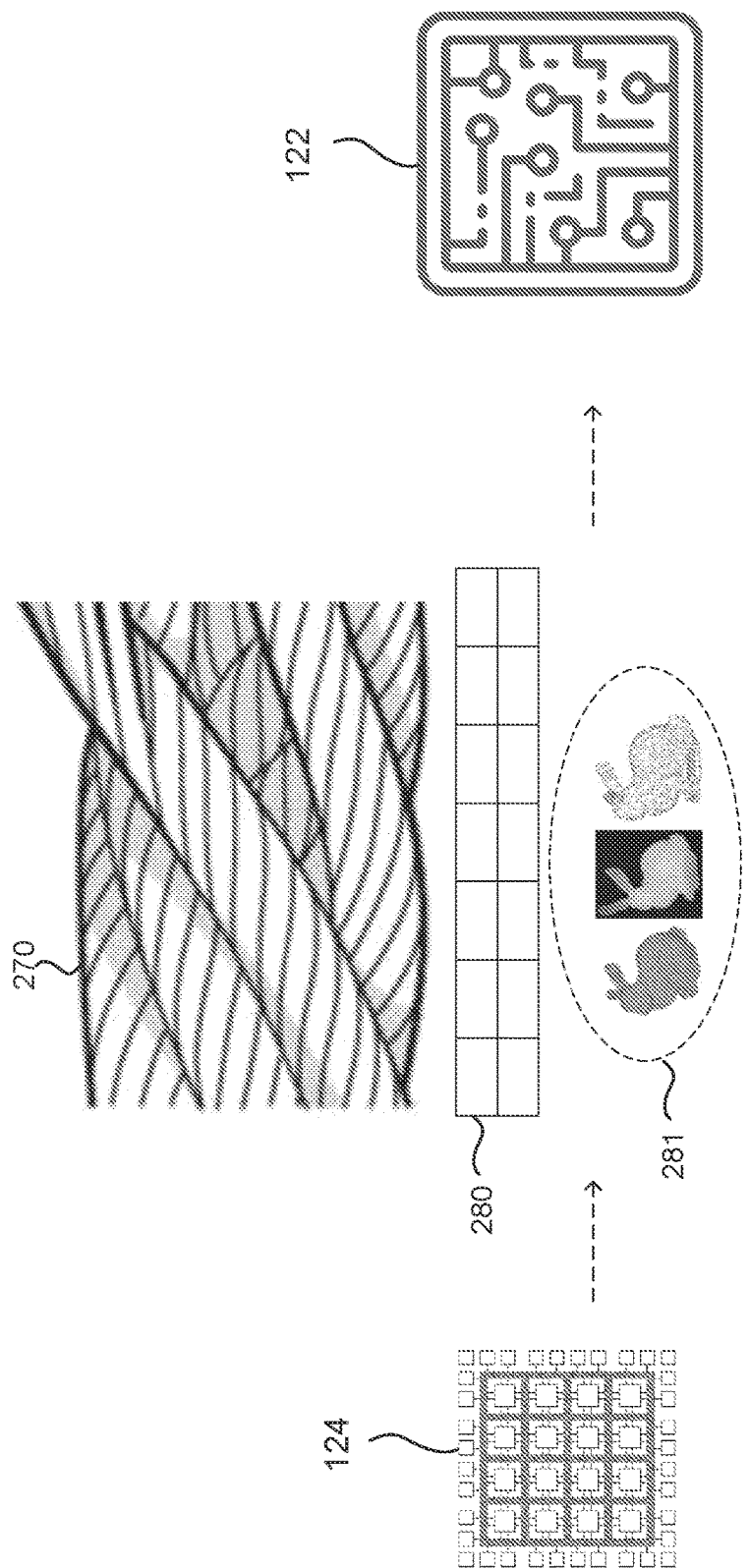

As shown in FIG. 2G, the computing system 122 may obtain sensor data 281 (e.g., raw or preprocessed sensor data) and a status 280 of the memory 210 through a common communication channel 270, which may include a physical data transfer link. In some embodiments, the status 280 may be implemented as the configuration 211 and/or the organization 215. The computing system 122 may obtain the sensor data 281 and the status 280 via a timeshare mechanism, for example, at alternating time intervals. In some examples, the computing system 122 may read the status 280 to obtain individual entries of the status 280. After reading each entry, the computing system 122 may confirm a connection timeout status and read the sensor data to an Inter Process Communication (IPC) memory. In some embodiments, individual reads may be merged based on contiguous memory addresses to reduce a number of reads. In some embodiments, the computing system 122 may also obtain raw sensor data, prior to preprocessing by the computing device 124. However, the raw sensor data may be used for perception but not for processing, as preprocessed data may be used for processing.

The status 280 may be located at a static memory location or address. Additionally, encoding of the status 280 may be static so that the computing system 122 may be able to decode the status 280. The location of the status 280 may be set by the computing system 122 through a protocol or by the computing device 124. If the computing system 122 sets the location of the status 280, the computing system 122 may transmit the protocol to the computing device 124.

Figure 2H:
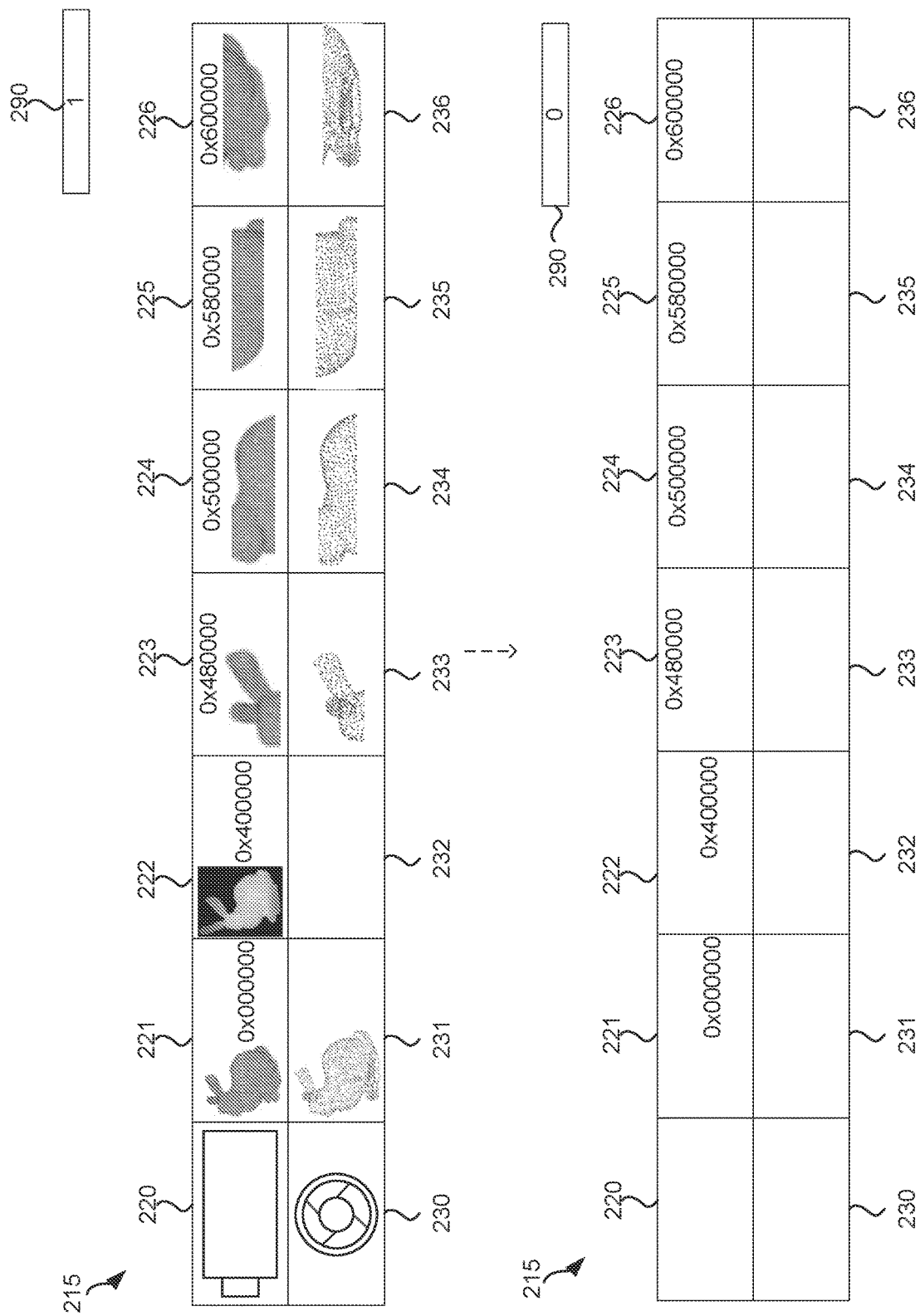

The computing system 122 may read and/or obtain the sensor data from the memory 210. Before the computing system 122 performs the reading and/or obtaining, the computing system 122 needs an indication, from the computing device 124, that a complete frame, portion, or other segment or the sensor data has been stored in an allocated buffer or slot that the computing system 122 is reading from. The computing device 124 may provide such an indication via one or more bits in respective bit fields corresponding to each of the buffers or slots allocated in the memory 210. In some embodiments, the bit fields may be located within the status 280. In some embodiments, the bit fields may, additionally or alternatively, be located on a separate register. By such indication, the computing device 124 may indicate to the computing system 122 that the sensor data has been committed to an allocated buffer or slot. The computing device 124 may set or flip the one or more bits to indicate that the sensor data has been committed to an allocated buffer or slot. For example, as shown in FIG. 2H, a bit field may be located in a register 290. A bit field of "1," or a first value, may indicate that sensor data has been committed to a data struct as represented by the organization 215.

Once the computing system 122 reads or obtains the sensor data from a buffer or slot of the memory 210, the computing system 122 may reset or flip back the one or more bits in the bit field of the allocated buffer or slot, to indicate that the sensor data is in an expired state. The computing device 124 may detect that the one or more bits have been reset and remove the sensor data to free the allocated buffer or slot for subsequent raw or preprocessed sensor data. For example, as shown in FIG. 2H, a bit field of "0," or a second value, may indicate that the sensor data stored in a data struct as represented by the organization 215 is in an expired state. The data struct may be located in the allocated buffer or slot. Accordingly, the sensor data may be removed from the allocated buffer or slot.

Therefore, both the computing system 122 and the computing device 124 may write to the register and/or the status 280 to set/flip or reset/flip back the one or more bits, or prevented from doing so; but only the computing device 124 may write any sensor data to the memory 210. In some embodiments, the computing device 124 is unable to reset or flip back the one or more bits, or prevented from doing so; only the computing system 122 may perform such a function. Additionally, in some embodiments, the computing system 122 is unable to set or flip the one or more bits, or prevented from doing so; only the computing device 124 may perform such a function. Such a mechanism prevents overwriting of unread sensor data from the memory 210, because the computing system 122 must provide an indication that the preprocessed or raw sensor data has already been read from the memory 210 before the computing device 124 removes the preprocessed or raw sensor data from the memory 210.

In some embodiments, the computing system 122 may determine that preprocessed or raw sensor data remaining in the memory 210 has already been read into the computing system 122 by comparing respective timestamps of the preprocessed or raw sensor data remaining in the memory 210 to the data already read into the computing system 122. Upon such determination, the computing system 122 may reset or flip back the one or more bits in the bit field and the computing device 124 may remove the preprocessed or raw sensor data from the memory 210.

Figure 3A:
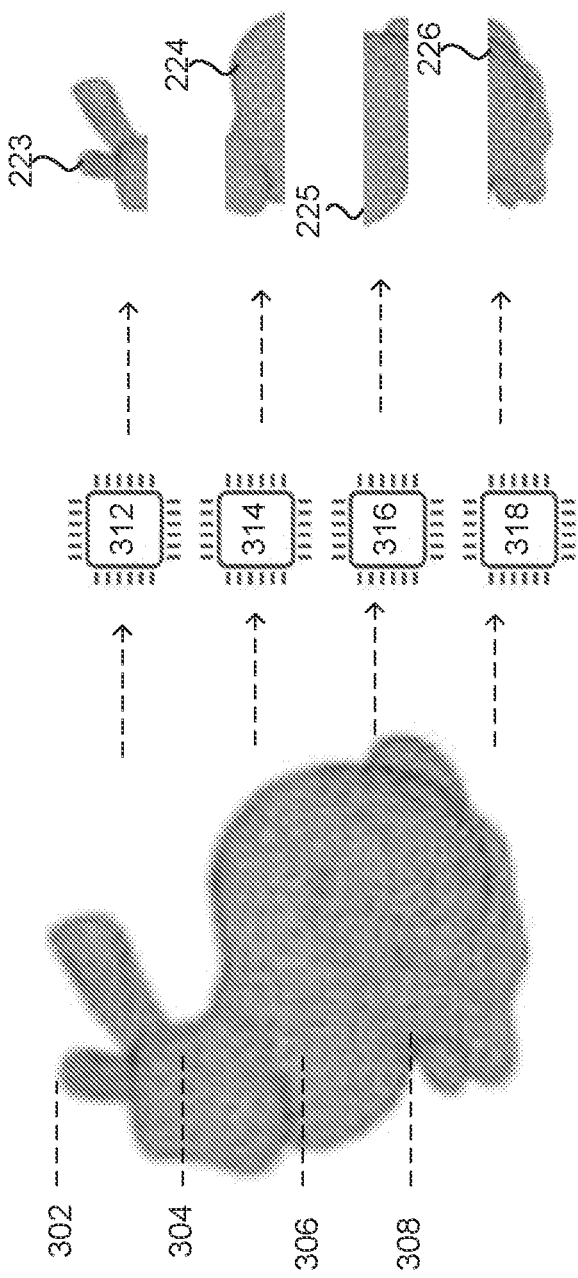
FIGS. 3A-3C illustrate implementations of a computing device shown in accordance with FIGS. 1A-1B, in accordance with an example embodiment of the present disclosure. In particular.

The foregoing describes a particular implementation in which camera data is being preprocessed and stored in the memory 210. In some embodiments, the computing device 124 may receive or obtain incoming or raw sensor data in YUV (YCbCr) format, temporarily store the incoming or raw sensor data in addresses of the memory 210, and perform preprocessing by reformatting or reencoding the sensor data into one or more of the JPEG thumbnail segment 221, the planar RGB segment 222, and the JPEG segments 223, 224, 225, and 226. One or more of the aforementioned segments may have been processed in parallel, using different processor cores of the computing device 124. Such parallel processing may reduce latency of processing, for example, from 15-16 milliseconds to 3-4 milliseconds. In some embodiments, the JPEG segments 223, 224, 225, and 226 may be processed in parallel by placing restart markers on raw sensor data or the YUV formatted sensor data. As shown in FIG. 3A, restart markers 302, 304, 306, and 308 may indicate starting positions and/or ending positions at which Huffman encoding is to be performed by different processor cores. The processor cores may include configurable arithmetic units and/or logic blocks. In FIG. 3A, a processor core 312 performs Huffman encoding between positions indicated by the restart markers 302 and 304. A processor core 314 performs Huffman encoding between positions indicated by the restart markers 304 and 306. A processor core 316 performs Huffman encoding between positions indicated by the restart markers 306 and 308. A processor core 318 performs Huffman encoding between positions indicated by the restart marker 308 and an end of the image or video. At each of the restart markers 302, 304, 306, and 308, DC values (Y, Cr, Cb) are reset independently from other restart markers. Following the Huffman encoding by each of the processor cores 312, 314, 316, and 318, headers from at least one of the segments that have been encoded, such as, every segment following a first segment may be removed by the computing device 124 or the computing system 122. For example, a header from the segment corresponding to positions between the restart markers 302 and 304 may be retained, but other headers corresponding to positions after the restart marker 304 may be removed. If the computing system 122 removes the headers from each of the segments, the computing system 122 may reference a field indicating which segment corresponds to actual sensor data, and removes bytes prior to that segment.

In some embodiments, configurations of a JPEG header, a JPEG footer, a Huffman Table header, a Quantization Table header indicating luminance and chrominance, a DC Huffman encoder table indicating luminance and chrominance, an AC Huffman encoder table, and a setting configuration, may be set via the register map. In some embodiments, if a XDMA (Xing Distributed Media Architecture) channel is used to write the configuration, an address for every 32-bit register may be required to be set. In some embodiments, the JPEG segments 223, 224, 225, and 226 generated by the processor cores, such as the processor cores 312, 314, 316, and 318, may be mapped to different pages. For example, the JPEG segment 223 may be mapped to the addresses 0x00000-0x0FFFF, the JPEG segment 224 may be mapped to the addresses 0x1000-0x1FFFF, the JPEG segment 225 may be mapped to the addresses 0x2000-0x2FFFF, and the JPEG segment 226 may be mapped to the addresses 0x3000-0x3FFFF.

Additionally, the computing device 124 may preprocess sensor data from different sensors concurrently. For example, the computing device 124 may preprocess sensor data from three different cameras concurrently. Thus, twelve processor cores may be used to process the four distinct segments from three different cameras in parallel, and an additional three processor cores may be used to process the JPEG thumbnail segments (for example, the JPEG thumbnail segment 221) from each of the three different cameras.

Figure 3B:
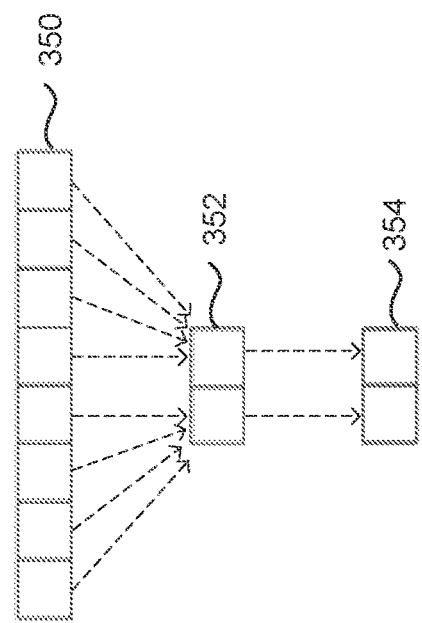
Figure 3C:
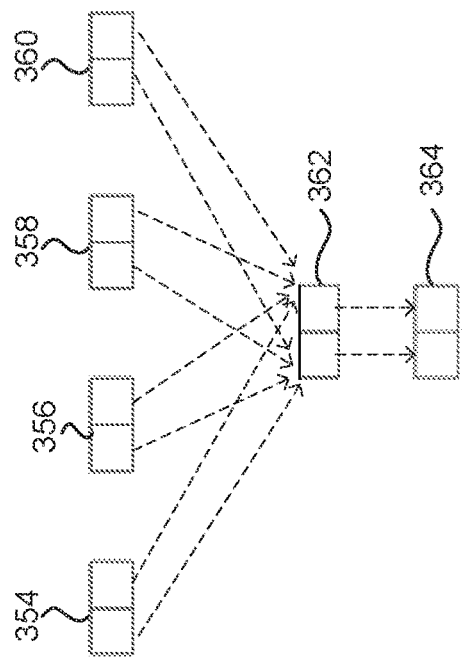

The computing device 224 may obtain the JPEG thumbnail segment 221 by downsampling or downscaling the YUV frame by a factor of four in both vertical and horizontal directions. The computing device 224 may read 32 bytes, or 1 by 8 pixels, at a time, shown as pixels 350 in FIG. 3B. First, the computing device 224 may combine four neighboring horizontal pixels, shown as pixels 352, and remove two least significant bits to condense the 1 by 8 pixels into 1 by 2 pixels, shown as pixels 354. The computing device 224 may obtain pixels 356, 358, and 360, as shown in FIG. 3C, by reading vertically and using the same procedure as that used to obtain the pixels 354. The computing device 224 may then obtain pixels 362 by summing the pixels 354, 356, 358, and 360, and obtain a horizontal average by removing two least significant bits to obtain 1 by 2 pixels 364. After obtaining a 8 by 8 block in such a manner, the 8 by 8 block may be written as a JPEG thumbnail segment, such as the JPEG thumbnail segment 221, into the memory 210, using same or similar mechanisms previously described, for example, in FIGS. 2A-2H.

Figure 4:
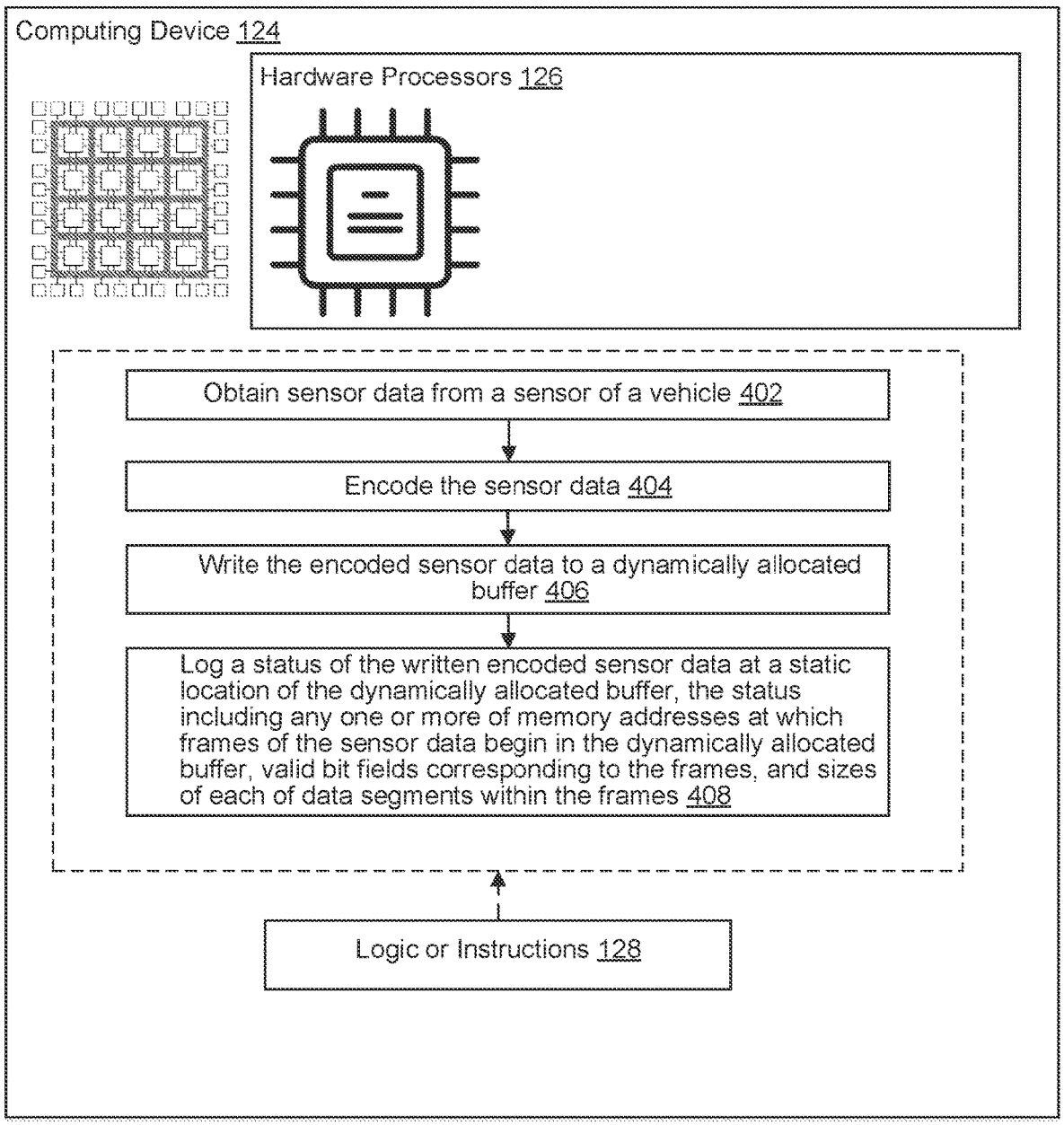
FIG. 4 illustrates a flowchart of an initial processing and memory allocation method, in accordance with an example embodiment of the present disclosure.

FIG. 4 illustrates a flowchart of a preprocessing, preliminary processing, or initial processing method, as performed by the computing device 124. The computing device 124 may include one or more hardware processors 126, which may be implemented, for example, as one or more processor cores. The computing device 124 may further include logic or instructions 128 that, when executed by the one or more hardware processors 126, cause the computing device 124 to perform particular functions. In some embodiments, the logic or instructions 128 may include hardware description languages (HDLs). In step 402, the computing device may obtain sensor data, for example, from sensors of the vehicle 101. Next, in step 404, the computing device may encode the sensor data. In step 406, the computing device may write the encoded sensor data to a dynamically allocated buffer. In step 408, the computing device may log a status of the written encoded sensor data at a static location of the dynamically allocated buffer, the status including any one or more of memory addresses at which frames of the sensor data begin in the dynamically allocated buffer, valid bit fields corresponding to the frames, and sizes of each of data segments within the frames. Furthermore, in some embodiments, the computing device may, in response to receiving a polling request from a computing resource, transmit the logged status to the computing resource over a same physical link through which the written encoded sensor data is transferred. In other embodiments, the computing resource may itself poll the logged status over the same physical link through which the computing resource polls the encoded sensor data. The computing resource may be implemented, for example, as the computing system 122.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
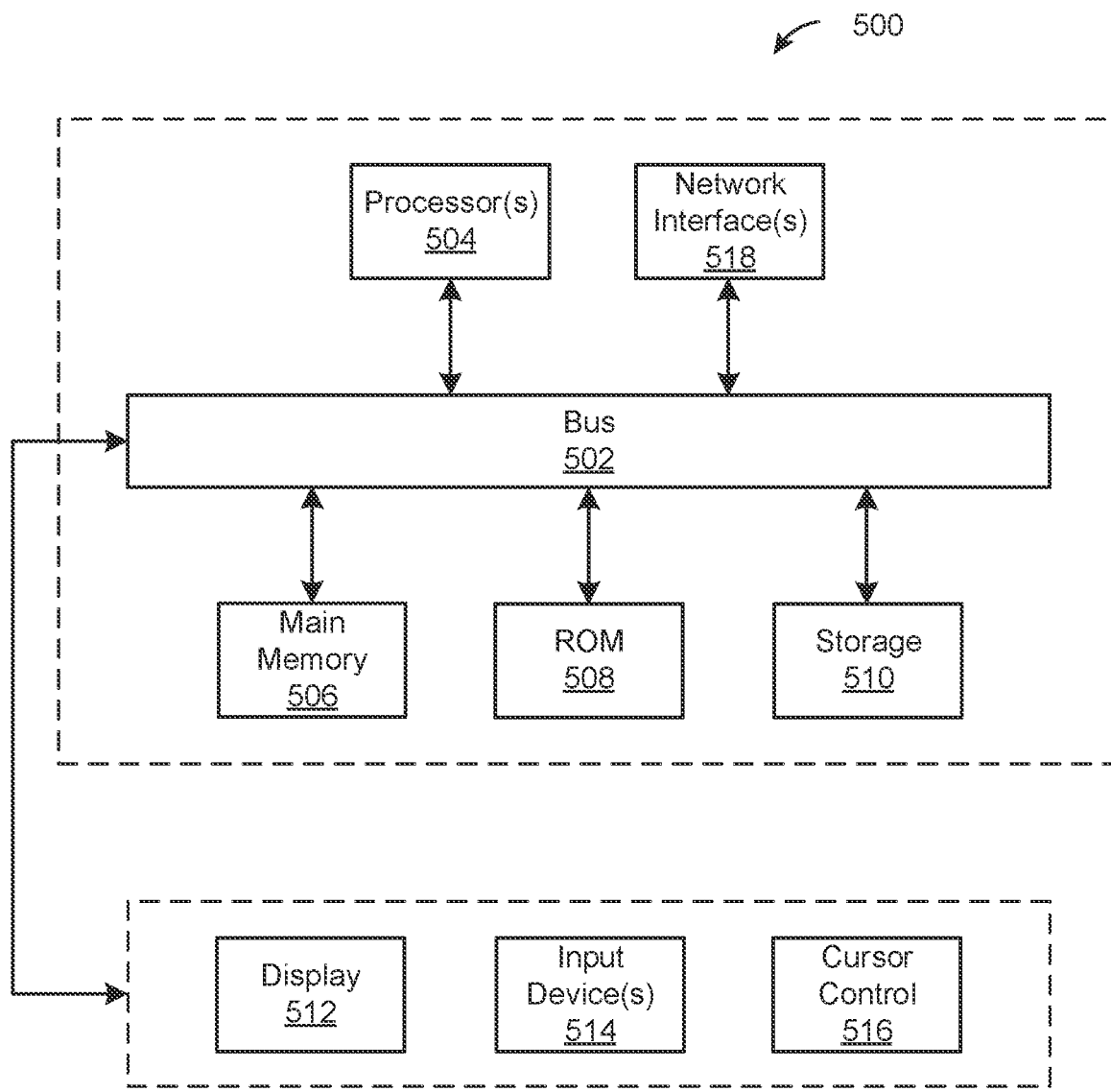
FIG. 5 illustrates a block diagram of a computer system upon which any of the embodiments described herein may be implemented.

FIG. 5 illustrates a block diagram of a computer system 500 upon which any of the embodiments described herein may be implemented. For example, a subset or an entirety of the computer system 500 may be implemented in the computing system 122. The computer system 500 includes a bus 502 or other communication mechanism for communicating information, one or more hardware processors 504 coupled with bus 502 for processing information. A description that a device performs a task is intended to mean that one or more of the hardware processor(s) 504 performs that task. The hardware processor(s) 504 may be hard-wired to perform techniques described in the Specification; they may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The hardware processor(s) 504 may also combine custom hard-wired logic, ASICs, or FPGAs with custom programming to accomplish the techniques. The hardware processor(s) 504 can include any suitable processing unit capable of accepting data as input, processing the input data in accordance with stored computer-executable instructions, and generating output data. The hardware processor(s) 504 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the hardware processor(s) 504 can have any suitable microarchitecture design that includes any number of constituent components such as, for example, registers, multiplexers, arithmetic logic units, controllers for controlling read/write operations to memory, branch predictors, or the like. The microarchitecture design of the hardware processor(s) 504 can be made capable of supporting any of a variety of instruction sets.

The computer system 500 also includes a main memory 506, such as a dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516. The computer system 500 also includes a communication interface 518 coupled to bus 502.

The term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A computing device configured to perform initial processing of sensor data, the computing device comprising:
one or more processors comprising processor cores that each encode different segments of the sensor data in parallel using markers that indicate a beginning or an end of each of the different segments, the processor cores comprising a first processor core and a second processor core; and
instructions or logic that, when executed by the one or more processors, cause the computing device to perform:
obtaining sensor data;
encoding the sensor data, wherein the encoding comprises:
using the first processor core, encoding a first segment of the sensor data from a first camera and using the second processor core, encoding a second segment of the sensor data from a second camera; or
using the first processor core, encoding a Joint Photographic Experts Group (JPEG) thumbnail and using the second processor core, encoding a planar red, green and blue (RGB) representation of the sensor data;
writing the encoded sensor data to a dynamically allocated buffer; and
logging a status of the written encoded sensor data at a static location of the dynamically allocated buffer, the status including any one or more of memory addresses at which frames of the sensor data begin in the dynamically allocated buffer, valid bit fields corresponding to the frames, and sizes of each of data segments within the frames.

2. The computing device of claim 1, wherein the instructions or logic further cause the computing device to remove headers on at least one of the different segments.

3. The computing device of claim 1, wherein the frames include data types; and
the status further includes a number of the data types supported by the computing device, a number of bytes in each field of each of the data segments; and a width of each of the data types as occupied in the buffer.

4. The computing device of claim 1, wherein the instructions or logic further cause the computing device to:
dynamically allocate the buffer based on an amount and an information content of the sensor data obtained.

5. The computing device of claim 1, wherein each of the valid bit fields indicate a bit mask corresponding to a data segment, the bit mask being determined by a spatial sequence in which the sensor data is ordered, the bit mask including a write lock functionality.

6. The computing device of claim 1, wherein the logging of the status includes storing the status in a table; and wherein the sensor data includes data from a LiDAR sensor.

7. A computing device configured to perform initial processing of sensor data, the computing device comprising:
one or more processors; and
instructions or logic that, when executed by the one or more processors, cause the computing device to perform:
obtaining sensor data;
encoding the sensor data;
dynamically allocating the buffer based on an amount and an information content of the sensor data obtained;
writing the encoded sensor data to the dynamically allocated buffer; and
logging a status of the written encoded sensor data at a static location of the dynamically allocated buffer, the status including any one or more of memory addresses at which frames of the sensor data begin in the dynamically allocated buffer, valid bit fields corresponding to the frames, and sizes of each of data segments within the frames.

8. The computing device of claim 7, further comprising:
a first processor core configured to obtain a JPEG thumbnail; and
a second processor core configured to obtain a planar RGB representation of the sensor data.

9. The computing device of claim 7, further comprising:
first processor cores configured to encode different segments of the sensor data from a first camera; and
second processor cores configured to encode different segments of the sensor data from a second camera.

10. The computing device of claim 7, wherein the frames include data types; and
the status further includes a number of the data types supported by the computing device, a number of bytes in each field of each of the data segments; and a width of each of the data types as occupied in the buffer.

11. The computing device of claim 7, wherein each of the valid bit fields indicate a bit mask corresponding to a data segment, the bit mask being determined by a spatial sequence in which the sensor data is ordered, the bit mask including a write lock functionality.

12. The computing device of claim 7, wherein the logging of the status includes storing the status in a table; and wherein the sensor data includes data from a LiDAR sensor.

13. The computing device of claim 7, wherein the instructions or logic further cause the computing device to remove headers on at least one of the different segments.

14. A computing device configured to perform initial processing of sensor data, the computing device comprising:
one or more processors; and
instructions or logic that, when executed by the one or more processors, cause the computing device to perform:
obtaining sensor data;
encoding the sensor data;
writing the encoded sensor data to a dynamically allocated buffer; and
logging a status of the written encoded sensor data at a static location of the dynamically allocated buffer, the status including any one or more of memory addresses at which frames of the sensor data begin in the dynamically allocated buffer, valid bit fields corresponding to the frames, and sizes of each of data segments within the frames, wherein:

the frames include data types; and the status further includes any two selected from a group consisting of a number of the data types supported by the computing device, a number of bytes in each field of each of the data segments, and a width of each of the data types as occupied in the buffer; or each of the valid bit fields indicate a bit mask corresponding to a data segment, the bit mask being determined by a spatial sequence in which the sensor data is ordered, the bit mask including a write lock functionality.

* * * * *